(12) United States Patent
Gauthier et al.

(10) Patent No.: US 11,755,744 B2
(45) Date of Patent: Sep. 12, 2023

(54) APPLICATION PROGRAMMING INTERFACE SPECIFICATION INFERENCE

(71) Applicant: Oracle International Corporation, Redwood Shores, CA (US)

(72) Inventors: Francois Gauthier, Brisbane (AU); Behnaz Hassanshahi, Brisbane (AU); Max Marius Schlüter, Berlin (DE)

(73) Assignee: Oracle International Corporation, Redwood Shores, CA (US)

( * ) Notice: Subject to any disclaimer, the term of this patent is extended or adjusted under 35 U.S.C. 154(b) by 757 days.

(21) Appl. No.: 16/676,760

(22) Filed: Nov. 7, 2019

(65) Prior Publication Data

US 2021/0141904 A1    May 13, 2021

(51) Int. Cl.
  *G06F 3/00*     (2006.01)
  *G06F 21/57*    (2013.01)
  *G06F 16/955*   (2019.01)
  *G06F 9/54*     (2006.01)

(52) U.S. Cl.
  CPC .............. *G06F 21/577* (2013.01); *G06F 9/54* (2013.01); *G06F 16/955* (2019.01)

(58) Field of Classification Search
  CPC .............................. G06F 9/541; G06F 16/955
  USPC ........................................................ 719/310
  See application file for complete search history.

(56) References Cited

U.S. PATENT DOCUMENTS

| | | | | |
|---|---|---|---|---|
| 6,085,198 A * | 7/2000 | Skinner | ................... | G06F 8/315 |
| | | | | 707/999.102 |
| 8,281,410 B1 * | 10/2012 | Sobel | ................... | G06F 21/554 |
| | | | | 726/16 |
| 2005/0039158 A1 * | 2/2005 | Koved | ................... | G06F 21/53 |
| | | | | 717/100 |
| 2005/0240943 A1 * | 10/2005 | Smith | ................... | G06F 3/00 |
| | | | | 719/328 |
| 2007/0058937 A1 * | 3/2007 | Ando | ................... | G11B 27/105 |
| 2010/0211907 A1 * | 8/2010 | Hughes, Jr. | ............. | G06F 21/51 |
| | | | | 726/28 |
| 2016/0089995 A1 * | 3/2016 | Sugiura | ................... | B60L 53/14 |
| | | | | 320/109 |
| 2018/0115551 A1 * | 4/2018 | Cole | ................... | H04L 41/18 |

(Continued)

FOREIGN PATENT DOCUMENTS

| | | | | |
|---|---|---|---|---|
| CA | 2630865 A1 * | 11/2008 | ............... | G06F 8/20 |
| EP | 1349166 A1 * | 10/2003 | ........... | G11B 27/031 |
| JP | 2004007507 A * | 1/2004 | ........... | G11B 27/031 |

(Continued)

OTHER PUBLICATIONS

Steve Loughran, A service API for Deployment. (Year: 2004).*

(Continued)

*Primary Examiner* — Lechi Truong
(74) *Attorney, Agent, or Firm* — Ferguson Braswell Fraser Kubasta PC

(57) ABSTRACT

A method may include identifying, by executing an application, an entry point corresponding to a Universal Resource Locator (URL) path, extracting, from the application, an entry point declaration corresponding to the entry point, determining, by performing a static analysis starting at the entry point declaration, that a parameter is accessible by the application, and inferring, by the static analysis, a type of the parameter by analyzing usage of the parameter by the application.

17 Claims, 8 Drawing Sheets

(56) References Cited

U.S. PATENT DOCUMENTS

2020/0159731 A1* 5/2020 Gino .................. G06F 9/547

FOREIGN PATENT DOCUMENTS

| JP | 2004129201 A | * | 4/2004 | ............ G06F 16/71 |
| KR | 20150106761 A | * | 9/2015 | |
| KR | 20160089995 A | * | 7/2016 | |

OTHER PUBLICATIONS

Jinqiu Yang, Towards Extracting Web API Specifications from Documentation. (Year: 2018).*
Matte Golfarelli, Data warehouse design from XML sources. (Year: 2001).*
Hackett, B., et al. "Fast and Precise Hybrid Type Inference for JavaScript", PLDI '12, Jun. 11-16, 2012, 11 pages.
Atlidakis, V., et al., "RESTler: Stateful Rest API Fuzzing", 2019 IEEE/ACM 41st International Conference on Software Engineering, May 31, 2019, 11 pages.
"Tern: Intelligent JavaScript Tooling", https://ternjs.net, accessed Jun. 17, 2019, 5 pages.

* cited by examiner

APPLICATION PROGRAMMING INTERFACE SPECIFICATION INFERENCE

BACKGROUND

In recent years, representational state transfer (REST) has become a common architecture for implementing web services. The task of creating a comprehensive specification for REST application programming interfaces (APIs) remains largely manual. While there are tools that assist developers implementing a web service from a specification, very few options exist to extract specifications from existing web applications. Common solutions use a proxy to dynamically capture requests and responses to the application under test and convert them to an API specification. It is the task of the developer, however, to dynamically exercise all entry points and to supply all possible parameters (a task that is tedious for small applications, and nearly impossible for large and complex applications). In addition, purely dynamic solutions are under-approximate by nature, and thus non-exhaustive.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including identifying, by executing an application, an entry point corresponding to a Universal Resource Locator (URL) path, extracting, from the application, an entry point declaration corresponding to the entry point, determining, by performing a static analysis starting at the entry point declaration, that a parameter is accessible by the application, and inferring, by the static analysis, a type of the parameter by analyzing usage of the parameter by the application.

In general, in one aspect, one or more embodiments relate to a system including a memory coupled to a computer processor, a repository configured to store an application including an entry point corresponding to a Universal Resource Locator (URL) path, and a code analyzer, executing on the computer processor and using the memory, configured to identify, by executing an application, the entry point, extract, from the application, an entry point declaration corresponding to the entry point, determine, by performing a static analysis starting at the entry point declaration, that a parameter is accessible by the application, and infer, by the static analysis, a type of the parameter by analyzing usage of the parameter by the application.

In general, in one aspect, one or more embodiments relate to a method including identifying, by executing an application, an entry point corresponding to a Universal Resource Locator (URL) path, extracting, from the application, an entry point declaration including a callback function and corresponding to the entry point, determining, by performing a static analysis starting at the entry point declaration, that a parameter is accessible by the callback function, and inferring, by the static analysis, a type of the parameter by analyzing usage of the parameter by the callback function.

Other aspects of the invention will be apparent from the following description and the appended claims.

DETAILED DESCRIPTION

Figure 1A:
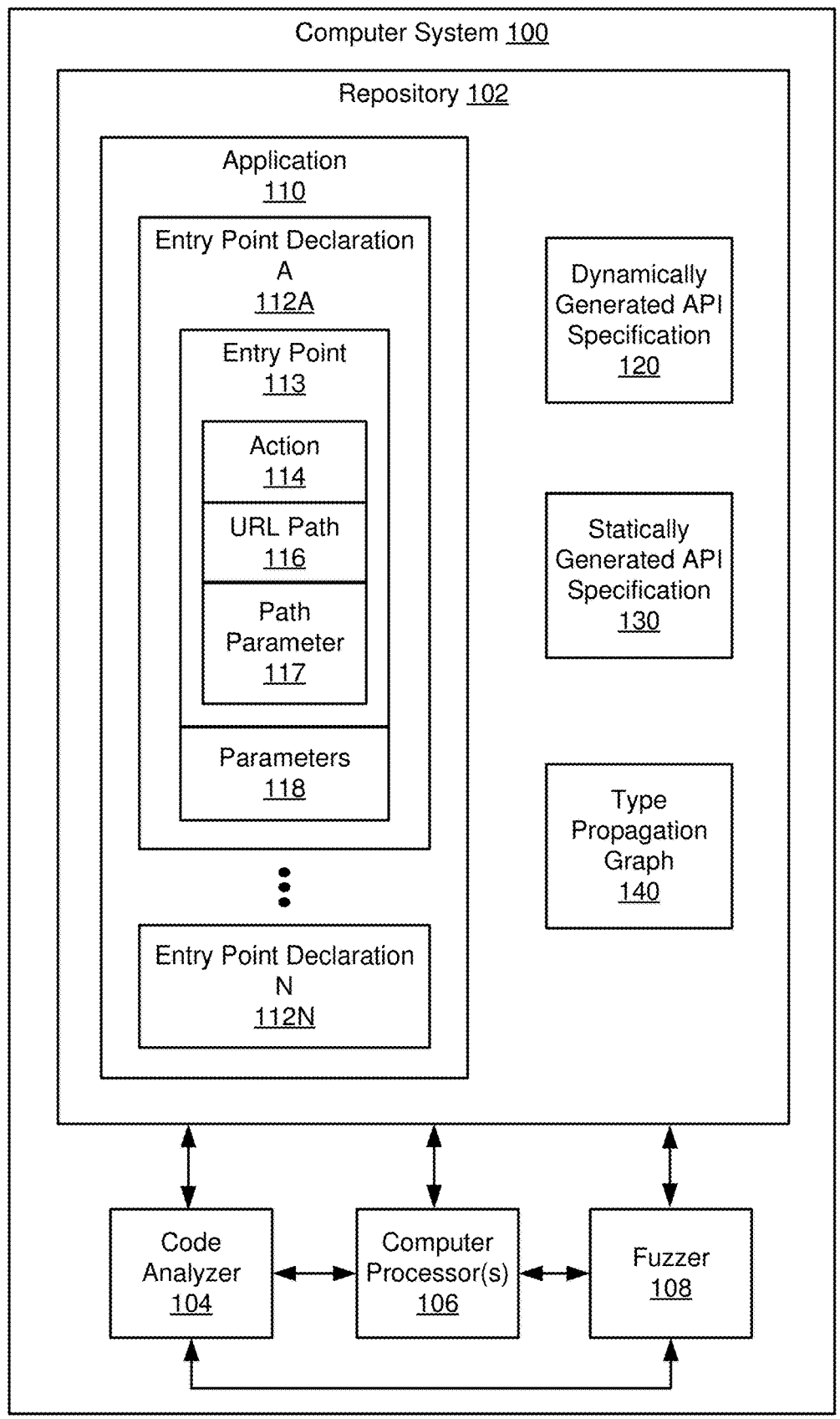
FIG. 1A and FIG. 1B show flow diagrams of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to inferring an application programming interface (API) specification from an application. In one or more embodiments, an entry point corresponding to a universal resource locator (URL) path and an action is identified by executing the application. For example, the URL path may be "/users" and the action may be a HyperText Transfer Protocol (HTTP) verb, such as "POST". The entry points may be dynamically identified using a proxy to monitor network traffic while the application is executing. An entry point declaration is extracted from the application corresponding to the entry point. For example, the entry point declaration may be extracted from the application by performing a static analysis of the application or by dynamic introspection of the application loaded in memory. A parameter accessible by the application may be identified by performing a static analysis starting at the entry point declaration. By seeding the static analysis with the entry point declaration, the scope of the static analysis is focused and limited, simplifying the computational complexity of the static analysis. In one or more embodiments, the static analysis collects parameters that may be accessed from requests processed by the application at the entry point. A type of the parameter may be inferred by the static analysis by analyzing usage of the parameter by the application. The inferred type may be based on propagating flows in a type propagation graph derived from the entry point declaration. A statically generated API specification may be derived that assigns the inferred type to the parameter. A vulnerability may be detected by fuzzing the application using the inferred type of the parameter. Using the inferred type of the parameter to generate parameter values during vulnerability testing may result in more useful parameter values than generating parameter values at random or solely based on dynamically observed requests.

FIG. 1A shows a computer system (100) in accordance with one or more embodiments of the invention. As shown in FIG. 1A, the computer system (100) includes a repository (102), a code analyzer (104), one or more computer processors (106), and a fuzzer (108). In one or more embodiments, the computer system (100) takes the form of the computing system (500) described with respect to FIG. 5A and the accompanying description below or takes the form of the client device (526) described with respect to FIG. 5B. In one or more embodiments, the computer processor(s) (106) takes the form of the computer processor(s) (502) described with respect to FIG. 5A and the accompanying description below.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes an application (110), a dynamically generated API specification (120), and a statically generated API specification (130), and a type propagation graph (140). In one or more embodiments, the application (110) is a collection of source code including various software components. The application (110) may include statements written in a programming language, or intermediate representation (e.g., byte code). The application (110) may be transformed by a compiler into binary machine code. Compiled machine code may be executed by a computer processor (502) in order to execute software components generated from the application (110). The application (110) may be any collection of object code (e.g., machine code generated by a compiler) or another form of the application (110).

The application (110) may be a web application. For example, the application (110) may execute at a server and receive requests over a network (e.g., network (520)) from clients. In one or more embodiments, the application (110) includes entry point declarations (112A, 112N). An entry point declaration (112A) may be a declaration of a function, method, or procedure. The entry point declaration (112A) may correspond to a source code location in the application (110). An entry point declaration (112A) may correspond to an entry point (113) where the application (110) is invoked by code external to the application (110). An entry point (113) may include an action (114), a universal resource locator (URL) path (116), and a path parameter (117). The action (114) may be performed on a resource identified by the URL path (116). For example, the action (114) may correspond to a verb used in a communications protocol. Continuing this example, an action (114) may be a verb in the HyperText Transfer Protocol (HTTP) protocol (e.g., DELETE, POST, GET, PUT, PATCH, etc.). The URL path (116) may identify a resource (e.g., a directory in a file system) accessible over a computer network (e.g., computer network (520)). Examples of URL paths (116) may be "/admin", "/users", etc.

In one or more embodiments, the entry point declaration (112A) includes one or more parameters (118). In one or more embodiments, the parameters (118) are arguments received at the entry point (113). One or more of the parameters (118) may be parameters of a request (e.g., a HTTP request) received at the entry point (113). One of the parameters (118) may be a path parameter (117) corresponding to the URL path (116). For example, a path parameter (117) may be "userId", where the value of the path parameter (117) may identify a specific user relative to the "/users" URL path.

In one or more embodiments, the entry point declaration (112A) includes a callback function. For example, the callback function may be executed on requests processed by the application (110).

Figure 1B:
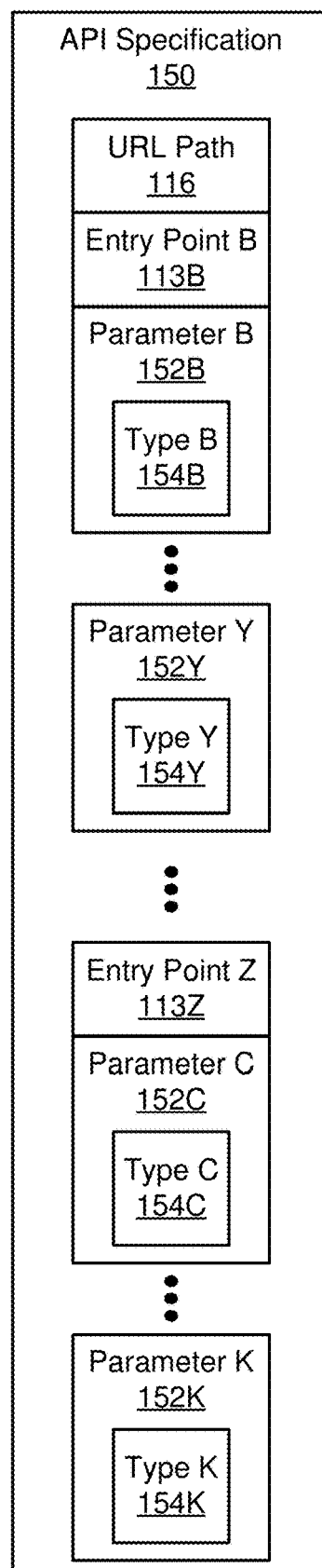

In one or more embodiments, the dynamically generated API specification (120) and statically generated API specification (130) are API specifications. An API specification may be a description of the input-output behavior of an API. An API specification may be represented using a specific format. For example, an API specification may be represented in the OpenAPI 2.0 (formerly called Swagger) format. Turning to FIG. 1B, in one or more embodiments, an API specification (150) includes one or more entry points (113B, 113Z) for a URL path (116). Each entry point (113B, 113Z) may correspond to one or more parameters (e.g., (152B, 152Y), (152C, 152K)). The API specification (150) may assign types (e.g., (154B, 154Y), (154C, 154K)) to the parameters (e.g., (152B, 152Y), (152C, 152K)). A type (154B) may constrain the values that the corresponding parameter may take. For example, the type may be integer, real, string, Boolean, etc. In one or more embodiments, the API specification (150) may assign, in addition to a type, one or more other attributes to a parameter (152B, 152Y, 152C, 152K). For example, the additional attributes may include one or more of the following: a name, a flag indicating whether or not a value for the parameter is required, a location of the parameter within an URL. For example, the location may be "path", "query", "header", "cookie", etc.

Returning to FIG. 1A, the dynamically generated API specification (120) may be based on observing the behavior of the application (110) in response to various inputs. Since the dynamically generated API specification (120) is based on specific inputs, the dynamically generated API specification (120) is an under-approximated (e.g., partial) specification. In contrast, the statically generated API specification (130) is based on analyzing the source code of the application (110) without executing the application (110).

In one or more embodiments, the type propagation graph (140) includes nodes and edges. The nodes may correspond to programming elements in the application (110). For example, a programming element may be a function call, an operation (e.g., a numerical or string operation), a field access, etc. In one or more embodiments, the node corresponding to a programming element may be tagged with a type constraint that indicates a type of input expected by the programming element. For example, a function or numerical operation may expect inputs of type "integer". The edges of the type propagation graph (140) may indicate the flow of values between nodes. An example type propagation graph is shown in FIG. 3C.

In one or more embodiments, the code analyzer (104) may be implemented in hardware (e.g., circuitry), software, firmware, and/or any combination thereof. In one or more embodiments, the code analyzer (104) includes functionality to identify entry points (113B, 113Z) of the application (110) while the application (110) is executing. The code analyzer (104) may include functionality to extract an entry point declaration (112A) from the application (110). The code analyzer (104) may include functionality to determine that a parameter (152B, 152Y, 152C, 152K) is accessible by the application (110) by performing a static analysis. The code analyzer (104) may include functionality to infer a type (154B, 154Y, 154C, 154K) of a parameter (152B, 152Y, 152C, 152K) by performing a static analysis.

In one or more embodiments, the fuzzer (108) may be implemented in hardware (e.g., circuitry), software, firmware, and/or any combination thereof. In one or more embodiments, the fuzzer (108) includes functionality to generate values for a parameter (152B, 152Y, 152C, 152K) during testing of the application (110).

In one or more embodiments, the computer processor (106) includes functionality to execute the code analyzer (104) and/or the fuzzer (108).

While FIG. 1A and FIG. 1B show a configuration of components, other configurations may be used without departing from the scope of the invention. For example, various components may be combined to create a single component. As another example, the functionality performed by a single component may be performed by two or more components.

Figure 2A:
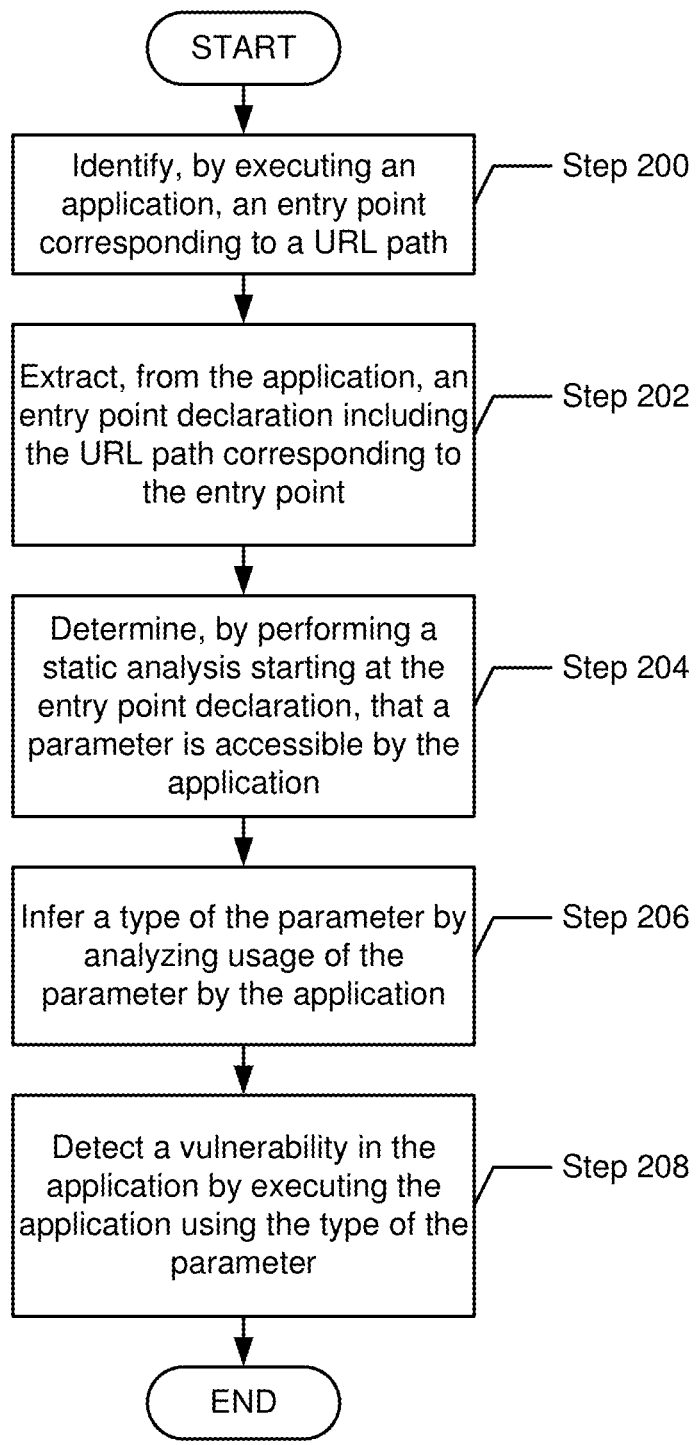
FIG. 2A and FIG. 2B show flowcharts of a method in accordance with one or more embodiments of the invention.

FIG. 2A shows a flowchart in accordance with one or more embodiments of the invention. The flowchart depicts a process for inferring an API specification. One or more of the steps in FIG. 2A may be performed by the components (e.g., the code analyzer (104) and/or fuzzer (108) of the computer system (100)), discussed above in reference to FIG. 1A. In one or more embodiments of the invention, one or more of the steps shown in FIG. 2A may be omitted, repeated, and/or performed in parallel, or in a different order than the order shown in FIG. 2A. Accordingly, the scope of the invention should not be considered limited to the specific arrangement of steps shown in FIG. 2A.

Initially, in Step 200, an entry point corresponding to a URL path is identified by executing an application. In one or more embodiments, the code analyzer identifies one or more entry points registered and exposed by the application using a proxy to monitor network traffic while the application is executing. As an example, the URL path of an entry point may be "/users" and the action of the entry point may be the HTTP verb "POST". Step 200 may be executed for each identified URL path.

In Step 202, an entry point declaration corresponding to the entry point is extracted from the application for the entry point. For example, the entry point declaration may be extracted from the application by performing a static analysis of the application or by dynamic introspection of the application loaded in memory. In one or more embodiments, the code analyzer dynamically instruments the application with code that extracts the source code locations of entry point declarations.

In Step 204, it is determined that a parameter is accessible by the application by performing a static analysis starting at the entry point declaration. In one or more embodiments, the static analysis determines that the parameter is accessible by the application as described with respect to FIG. 2B and the accompanying description below. In one or more embodiments, the static analysis collects one or more parameters that may be accessed (e.g., read) from requests processed by the application at the entry point. By seeding the static analysis with the entry point declaration, the scope of the static analysis is focused and limited, which has the advantage of simplifying the computational complexity of the static analysis. For example, the scope of the static analysis starting at the entry point declaration may be limited to a fragment of the application. In contrast, static analysis of the entire application may be computationally expensive, particularly for applications written in highly dynamic and interactive programming languages such as JavaScript.

In Step 206, a type of the parameter is inferred by the static analysis by analyzing usage of the parameter by the application. In one or more embodiments, the static analysis infers the type of the parameter as described with respect to FIG. 2B and the accompanying description below. The code analyzer may derive a statically generated API specification that assigns the statically inferred type to the parameter.

In one or more embodiments, requests processed by the application are observed for the entry point. The code analyzer may use a proxy to intercept and observe the requests. For example, the requests may be HTTP requests received at the entry point by the application from various clients. In one or more embodiments, the code analyzer derives a dynamically generated API specification from the observed requests. The dynamically generated API specification may include, for the entry point corresponding to the URL path, the names, types and/or other attributes of parameters included in the observed requests. For example, if the value of a parameter in one or more observed requests is an integer, then the code analyzer may infer that the type of the parameter is "integer". The dynamically generated API specification may include each entry point identified in Step 200 above corresponding to the URL path.

The code analyzer may merge the dynamically generated API specification derived and the statically generated API specification into a merged API specification as follows. When the dynamically generated API specification and the statically generated API specification assign incompatible types to the parameter, then the merged API specification may assign the type inferred by the dynamically generated API specification to the parameter. For example, a "string" type may be incompatible with an "integer" type. That is, when the assigned types conflict, the dynamically generated API specification, which, unlike the statically generated API specification, is derived from actual, observed parameter values, may, as a conflict resolution heuristic, be given higher priority. Alternatively, when the dynamically generated API specification and the statically generated API specification assign different types to the parameter, where one of the types is a subtype of the other type, then the merged API specification may assign the more general type to the parameter.

The merged API specification may include the union of the parameters included in the dynamically generated API specification and the dynamically generated API specification. For example, the statically generated API specification may include a parameter for the entry point that is not included in the dynamically generated API specification. That is, since dynamic analysis depends on the inputs (e.g., requests) interactively provided to the application, it may be the case that some parameters were not present in the observed input stream from which the dynamically generated API specification was derived. In addition, the validity and type of request parameters included in an HTTP request may be determined by statically analyzing the use of the parameter within the application. For example, if a program element within the application accesses a parameter (e.g., using the name of the parameter), then the parameter is a valid parameter. In addition, the expected type of a parameter may be identified by analyzing the program elements of the application that access the parameter. However, a dynamic analysis cannot determine the validity of request parameters included in an HTTP request, since the dynamic analysis does not reason about the semantics of the application.

In one or more embodiments, the merged API specification includes the union of the entry points included in the dynamically generated API specification and the dynamically generated API specification. For example, the dynamically generated API specification may include a parameter for the entry point that is not included in the statically generated API specification. Continuing this example, a parameter observed in the dynamic input stream may not be accessed by the application. Still continuing this example, the dynamically observed parameter may be used in computing a checksum, but may not be directly accessed by the application.

In Step 208, a vulnerability is detected in the application by executing the application using the type of the parameter. In one or more embodiments, the fuzzer generates values for the parameter using the type included in the merged API specification described in Step 206 above. Using the inferred type of the parameter to generate parameter values during vulnerability testing may result in generating more useful parameter values than selecting parameter values at random. For example, the fuzzer may generate requests that include values for the parameter that are inconsistent with the type of the parameter in order to assess the behavior of the application when presented with unexpected or invalid input. Alternatively, the fuzzer may generate requests that include values for the parameter that are consistent with the type of the parameter but represent edge cases that may be difficult to process. For example, the fuzzer may use, for a parameter with an integer type, zero and/or very large positive and/or negative numbers as parameter values.

Benchmarks have shown that the aforementioned techniques for inferring an API specification result in deeper code coverage during testing when compared to conventional techniques that rely on dynamic analysis, due to identifying additional parameters and systematically identifying expected types for parameters.

Figure 2B:
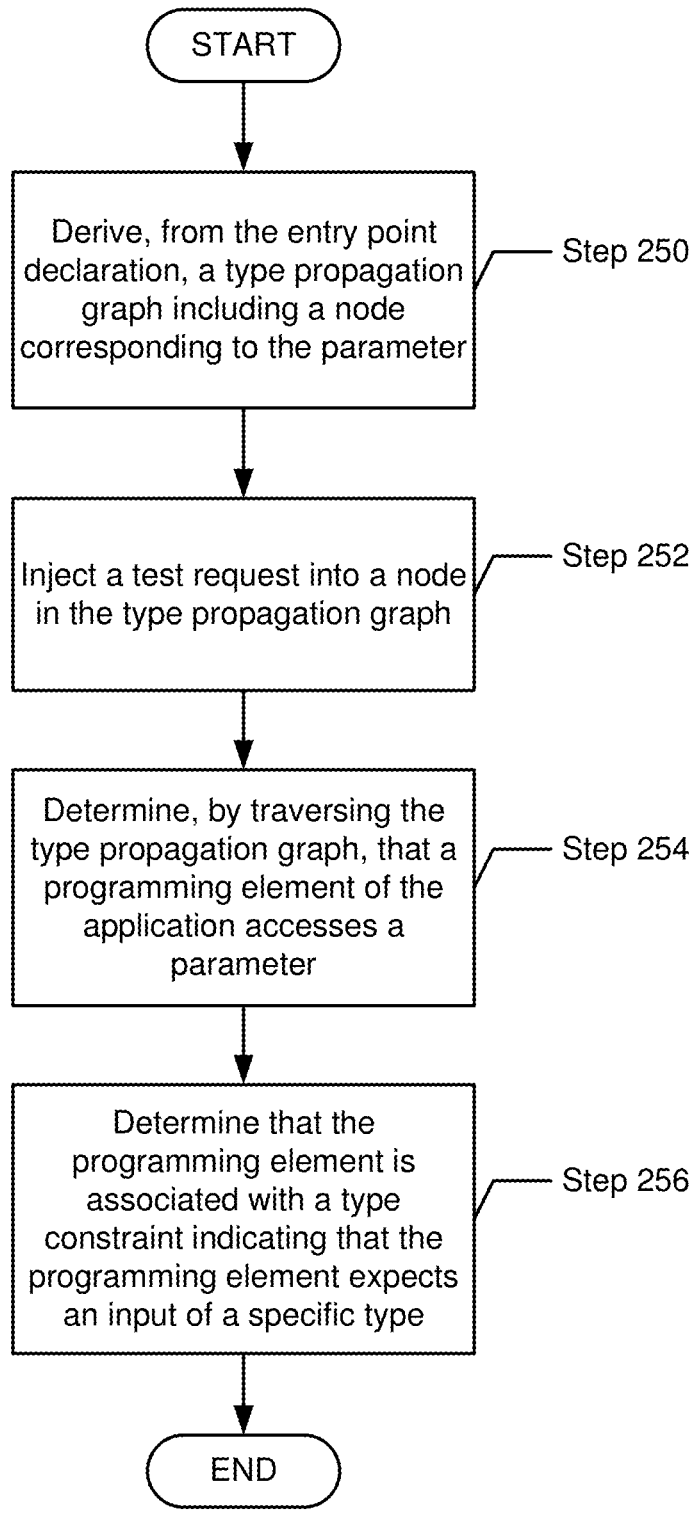

FIG. 2B shows a flowchart in accordance with one or more embodiments of the invention. The flowchart depicts a process for inferring a type of a parameter. Moreover, the flowchart in FIG. 2B may correspond to Step 204 and Step 206 in FIG. 2A. One or more of the steps in FIG. 2B may be performed by the components (e.g., the code analyzer (104) of the computer system (100)), discussed above in reference to FIG. 1A. In one or more embodiments of the invention, one or more of the steps shown in FIG. 2B may be omitted, repeated, and/or performed in parallel, or in a different order than the order shown in FIG. 2B. Accordingly, the scope of the invention should not be considered limited to the specific arrangement of steps shown in FIG. 2B.

Initially, in Step 250, a type propagation graph is derived from the entry point declaration. The code analyzer may derive the type propagation graph by performing a static analysis of the application starting at the entry point declaration. For example, the static analysis may use the type propagation graph to analyze and/or propagate flows from parameters received at the entry point declaration to programming elements in the application that access parameters. Continuing this example, the parameters may be parameters of a request processed by the application. Still continuing this example, the request may be processed by a callback function of the application. An example of a type propagation graph is shown in FIG. 3C.

In Step 252, a test request is injected into a node of the type propagation graph. In one or more embodiments, the test request is a request object with undefined parameters. The static analysis may use the test request as a container for collecting parameters that may be accessed by the application, as described in Step 254 below. For example, the test request may be injected into a node in the type propagation graph corresponding to a request processed by the application. Continuing this example, the node in the type propagation graph may correspond to a request received by a callback function of the application.

In Step 254, it is determined, by traversing the type propagation graph starting with the node injected with the test request, that a programming element of the application access a parameter of the test request. As the static analysis traverses the type propagation graph, each parameter (e.g., property) of the injected test request that is accessed by a programming element of the application may be added to the collection of parameters of the test request.

In Step 256, it is determined that the programming element that accessed the parameter is associated with a type constraint indicating that the programming element expects an input of a specific type. For example, the node in the type propagation graph corresponding to the programming element may be tagged with a type constraint that indicates a specific type of input is expected by the programming element. Continuing this example, when a function or numerical operation compares its input to an integer constant, then it may be inferred that the expected type of input is "integer". Similarly, a write to a field of an object may expect an input of a specific type. The specific type may be the type inferred in Step 206 above.

FIG. 3A, FIG. 3B, FIG. 3C, and FIG. 4 show an implementation example(s) in accordance with one or more embodiments. The implementation example(s) are for explanatory purposes only and not intended to limit the scope of the invention. One skilled in the art will appreciate that implementation of embodiments of the invention may take various forms and still be within the scope of the invention.

Figures 3A, 3B:
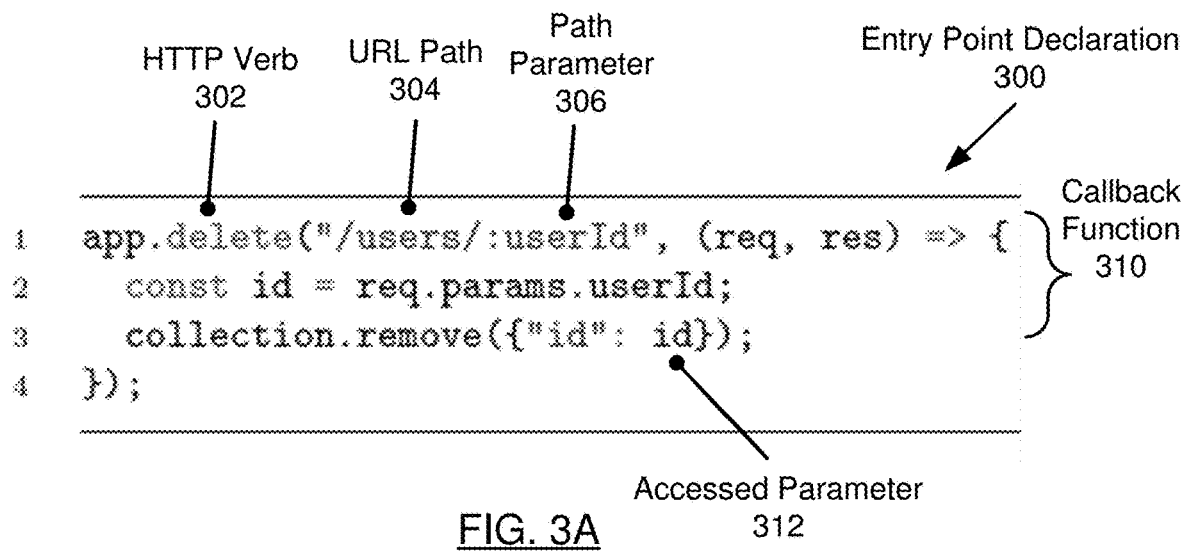
FIG. 3A, FIG. 3B, FIG. 3C, and FIG. 4 show examples in accordance with one or more embodiments of the invention.
Figure 3C:
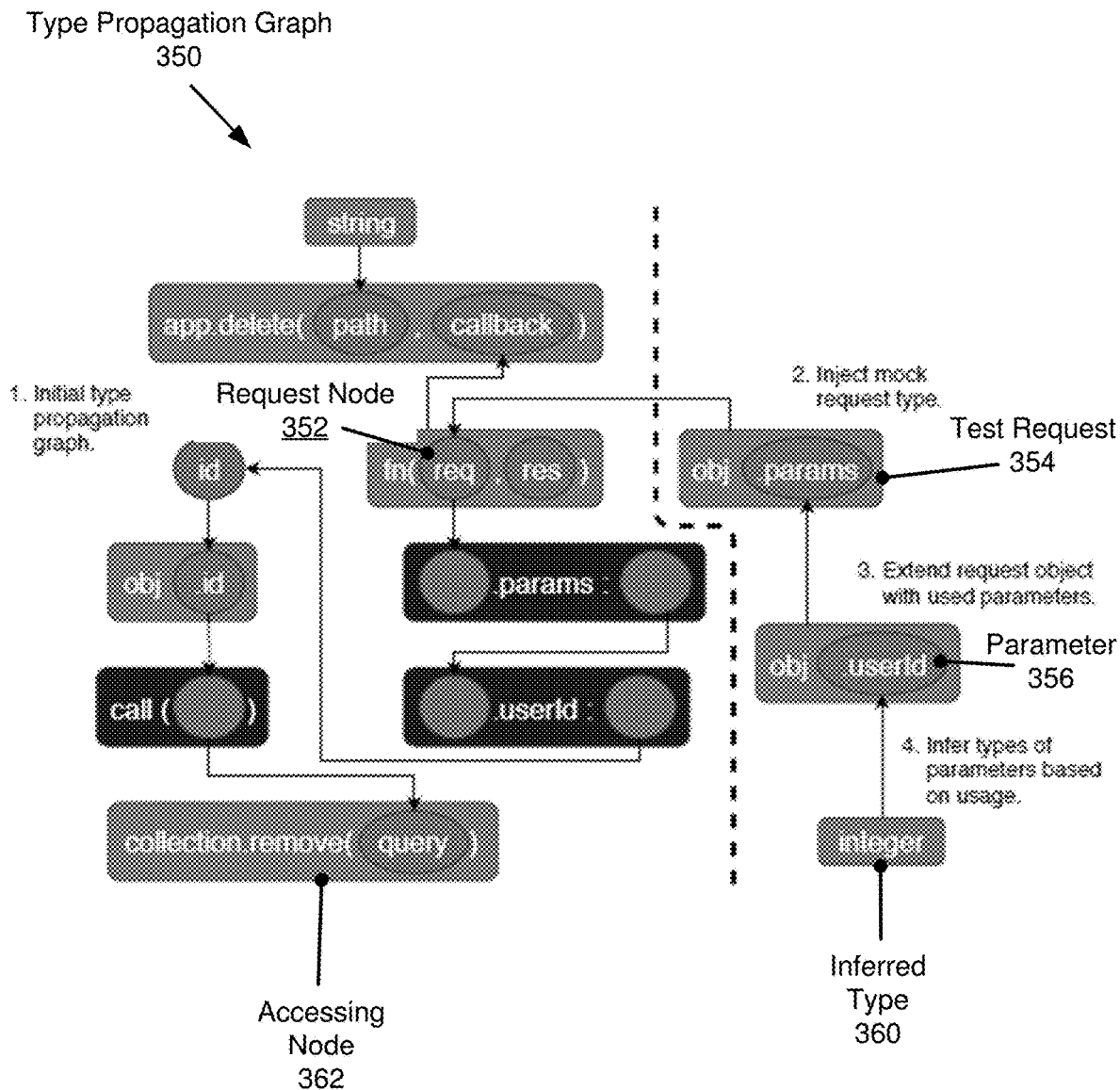

FIG. 3A shows an entry point declaration (300) ((112A, 112N) in FIG. 1A) of a JavaScript Express application (a web application framework for Node.Js). The entry point declaration (300) defines an HTTP verb "delete" (302) ((11) in FIG. 1A), which accepts the following arguments: a URL path "/users/" (304) ((116) in FIG. 1A and FIG. 1B), a path parameter ":userId" (306) ((117) in FIG. 1A), and a callback function (310) that processes HTTP requests. The callback function (310) accesses the path parameter ":userId" (306) at line 2, and removes the document corresponding to the path parameter ":userId" (306) from a collection in a database at line 3. FIG. 3A shows an accessed parameter "id" (312) that aliases the parameter ":userId" (306).

FIG. 3B shows an API specification (320) ((150) in FIG. 1B) that assigns a type "integer" (328) ((154B, 154Y, 154C, 154K) in FIG. 1B) to the parameter ":userId" (326) for the HTTP verb "delete" (322) corresponding to the URL path "/users/" (324).

Initially, the code analyzer executes the application using a proxy to monitor HTTP requests while the application is executing to identify the entry points in the application. One such entry point corresponds to the HTTP verb "delete" (302), the URL path "/users/" (304), and the path parameter ":userId" (306). The code analyzer also instruments the application with code to extract the source code locations of the entry point declarations in the application. One of the extracted source code locations corresponds to the entry point declaration (300) for the HTTP verb "delete" (302).

Next, the code analyzer performs a static analysis of the application starting at the entry point declaration (300) to identify parameters accessible by the application. The static analysis derives a type propagation graph (350), as shown to the left of the dotted line in FIG. 3C. Using the type propagation graph (350), the static analysis attempts to propagate flows from parameters received by the application to programming elements within the application that access the received parameters.

Since the static analysis starts at the entry point declaration (300), the static analysis may not analyze server code responsible for listening to incoming requests, converting the requests to request objects, and forwarding the request objects to the appropriate HTTP verb (302). To bootstrap the type inference process for requests, the static analysis injects a test request (354) into the request argument of the callback function (310). That is, the static analysis injects a test request (354) into a request node (352) of the type propagation graph (350) corresponding to a request processed by the callback function (310). The test request (354) is a request object with undefined parameters. The static analysis then attempts to identify parameters that may be accessed from the test request (354) by the callback function (310). The static analysis determines, by traversing the type propagation graph (350) starting with the request node (352), that an accessing node (362) corresponding to the "collection.remove" operation of the callback function (310) accesses a ":userId" parameter (e.g., property), which is aliased by the accessed parameter "id" (312) of FIG. 3A. The static analysis then adds the parameter ":userId" (356) to the collection of parameters of the test request (354). In this manner, the static analysis uses the test request (354) as a container for collecting parameters that may be accessed by the callback function (310). Next, the static analysis determines that the accessing node (362) corresponds to an operation (i.e., the "collection.remove" operation) associated with a type constraint indicating an expected input of type "integer". The static analysis then associates the inferred type "integer" (360) with the parameter ":userId" (356) in the test request (354).

Next, the fuzzer detects a vulnerability in the application by executing the callback function (310) using the inferred type "integer" (360) for the parameter ":userId" (356). The fuzzer generates a range of integer values for the parameter ":userId" (356) to test the behavior of the application when presented with the expected "integer" type of input. In addition, the fuzzer generates non-integer values for the parameter ":userId" (356) to test the behavior of the application when presented with unexpected or invalid inputs.

Figure 4:
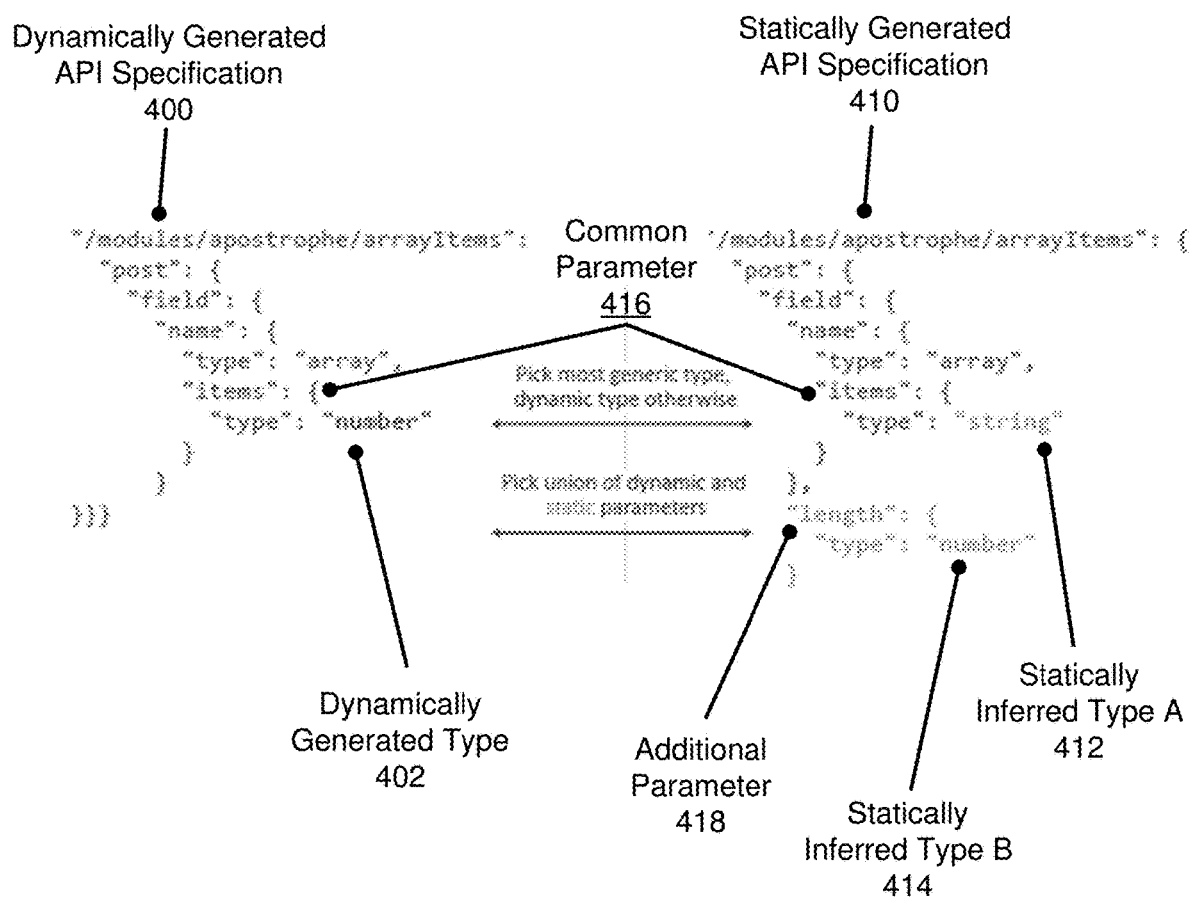

FIG. 4 illustrates merging a dynamically generated API specification (400) and a statically generated API specification (410). The code analyzer generates the dynamically generated API specification (400) based on observing requests received by an application. The code analyzer generates the statically generated API specification (410) based on a static analysis of the application.

The dynamically generated API specification (400) includes a dynamically generated type "number" (402) for the parameter "items" and the statically generated API specification (410) includes a statically inferred type "string" (412) for the parameter "items". That is, the parameter "items" is a common parameter (416) included in both the dynamically generated API specification (400) and the statically generated API specification (410). The dynamically generated type "number" (402) conflicts with the statically inferred type "string" (412), and the code analyzer gives higher priority to the dynamically generated type "number" (402). Thus, the code analyzer includes the dynamically generated type "number" (402) for the parameter "items" in a merged specification that represents the synthesis of the dynamically generated API specification (400) and the statically generated API specification (410).

The statically generated API specification (410) also includes an additional parameter "length" (418) that is not present in the dynamically generated API specification (400), with a corresponding statically inferred type "number" (414). The additional parameter "length" (418) was omitted from the dynamically generated API specification (400) because the parameter "length" (418) was not present in the observed stream of HTTP requests processed by the application. The code analyzer includes the statically inferred type "number" (414) for the additional parameter "length" (418) in the merged specification since the merged specification represents the union of the parameters identified by the dynamically generated API specification (400) and the statically generated API specification (410).

Figure 5A:
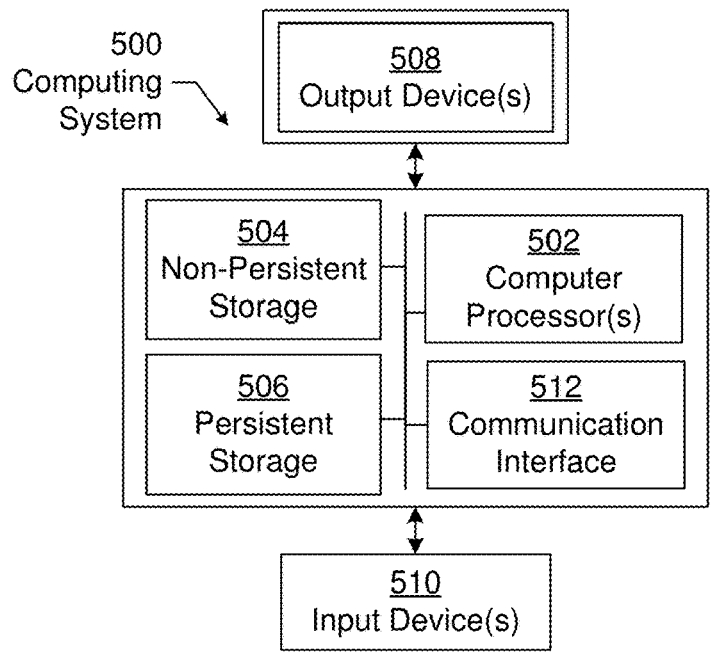
FIG. 5A and FIG. 5B show a flow diagram of computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
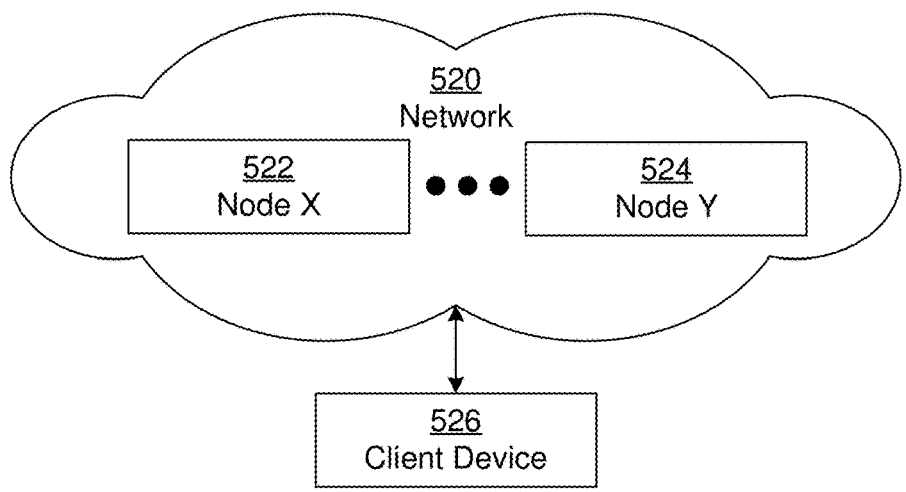

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (e.g., database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
identifying, by executing an application, an entry point corresponding to a Universal Resource Locator (URL) path, wherein the entry point is a location in the application where the application is invoked by code external to the application;
extracting, from the application, an entry point declaration corresponding to the entry point;
determining, by performing a static analysis starting at the entry point declaration, that a first parameter is accessible by the application, wherein the first parameter is an argument received by the application at the entry point of the application;
inferring, by the static analysis, a first type of the first parameter by analyzing usage of the first parameter by the application;
observing, for the entry point, one or more requests processed by the application;
deriving, from the one or more requests, a dynamically generated Application Programing Interface (API) specification corresponding to the entry point; and
deriving, by the static analysis, a statically generated API specification corresponding to the entry point, wherein the statically generated API specification assigns the first type to the first parameter.

2. The method of claim 1, further comprising:
detecting a vulnerability in the application by executing the application using the first type of the first parameter.

3. The method of claim 1, wherein the dynamically generated API specification further comprises a second parameter, the method further comprising:
merging the dynamically generated API specification and the statically generated API specification into a merged API specification comprising, for the entry point, the first parameter and the second parameter.

4. The method of claim 1, wherein the dynamically generated API specification assigns a second type to the first parameter, the method further comprising:
determining that the first type and the second type are incompatible; and
merging the dynamically generated API specification and the statically generated API specification into a merged API specification that assigns the second type to the first parameter.

5. The method of claim 1, wherein the dynamically generated API specification assigns a second type to the first parameter, the method further comprising:
determining that the second type is a subtype of the first type; and
merging the dynamically generated API specification and the statically generated API specification into a merged API specification that assigns the first type to the first parameter.

6. The method of claim 1, further comprising:
deriving, from the entry point declaration, a type propagation graph comprising a plurality of nodes; and
injecting a test request into a node of the plurality of nodes, wherein determining that the first parameter is accessible by the application comprises determining, by traversing the type propagation graph starting with the node injected with the test request, that a programming element of the application accesses the first parameter.

7. The method of claim 6, wherein analyzing the usage of the first parameter by the application comprises determining that the programming element is associated with a type constraint indicating that the programming element expects an input of the first type.

8. A system, comprising:
a memory coupled to a computer processor;
a repository configured to store an application comprising an entry point corresponding to a Universal Resource Locator (URL) path, wherein the entry point is a location in the application where the application is invoked by code external to the application;
a code analyzer, executing on the computer processor and using the memory, configured to:
identify, by executing the application, the entry point;
extract, from the application, an entry point declaration corresponding to the entry point,
determine, by performing a static analysis starting at the entry point declaration, that a first parameter is accessible by the application, wherein the first parameter is an argument received by the application at the entry point of the application, and
infer, by the static analysis, a first type of the first parameter by analyzing usage of the first parameter by the application; and
a fuzzer, executing on the computer processor and using the memory, configured to:
detect a vulnerability in the application by executing the application using the first type of the first parameter.

9. The system of claim 8, wherein the code analyzer is further configured to:
observe, for the entry point, one or more requests processed by the application;
derive, from the one or more requests, a dynamically generated Application Programing Interface (API) specification corresponding to the entry point; and
derive, by the static analysis, a statically generated API specification corresponding to the entry point, wherein the statically generated API specification assigns the first type to the first parameter.

10. The system of claim 9, wherein the dynamically generated API specification further comprises a second parameter, and wherein the code analyzer is further configured to:
merge the dynamically generated API specification and the statically generated API specification into a merged API specification comprising, for the entry point, the first parameter and the second parameter.

11. The system of claim 9, wherein the dynamically generated API specification assigns a second type to the first parameter, and wherein the code analyzer is further configured to:
merge the dynamically generated API specification and the statically generated API specification into a merged API specification that assigns the second type to the first parameter.

12. The system of claim 9, wherein the dynamically generated API specification assigns a second type to the first parameter, and wherein the code analyzer is further configured to:
determine that the second type is a subtype of the first type; and merge the dynamically generated API specification and the statically generated API specification into a merged API specification that assigns the first type to the first parameter.

13. The system of claim 8, wherein the code analyzer is further configured to:
   derive, from the entry point declaration, a type propagation graph comprising a plurality of nodes; and
   inject a test request into a node of the plurality of nodes,
   wherein determining that the first parameter is accessible by the application comprises determining, by traversing the type propagation graph starting with the node injected with the test request, that a programming element of the application accesses the first parameter.

14. The system of claim 13,
   wherein analyzing the usage of the first parameter by the application comprises determining that the programming element is associated with a type constraint indicating that the programming element expects an input of the first type.

15. A method, comprising:
   identifying, by executing an application, an entry point corresponding to a Universal Resource Locator (URL) path, wherein the entry point is a location in the application where the application is invoked by code external to the application;
   extracting, from the application, an entry point declaration comprising a callback function and corresponding to the entry point, wherein the callback function processes a request, and wherein the request comprises a parameter;
   determining, by performing a static analysis starting at the entry point declaration, that the parameter is accessible by the callback function, wherein the parameter is an argument received by the application at the entry point of the application; and
   inferring, by the static analysis, a type of the parameter by analyzing usage of the parameter by the callback function; and
   detecting a vulnerability in the application by executing the callback function using the type of the parameter.

16. The method of claim 15, further comprising:
   deriving, from the entry point declaration, a type propagation graph comprising a plurality of nodes; and
   injecting a test request into a node of the plurality of nodes,
   wherein determining that the parameter is accessible by the callback function comprises determining, by traversing the type propagation graph starting with the node injected with the test request, that a programming element of the callback function accesses the parameter.

17. The method of claim 16,
   wherein analyzing the usage of the parameter by the callback function comprises determining that the programming element is associated with a type constraint indicating that the programming element expects an input of the type.

* * * * *